July 26, 1949.         J. S. KIRBY         2,477,519
WATER SPRAYER FOR GARDEN HOSE NOZZLES
Filed March 26, 1946
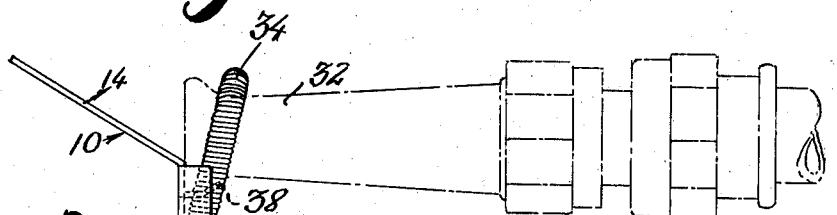
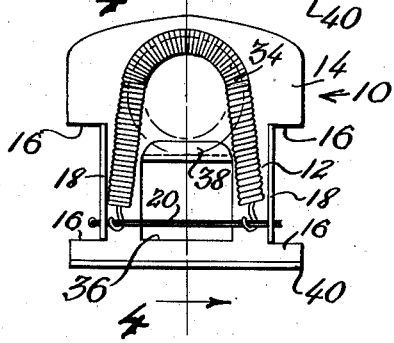
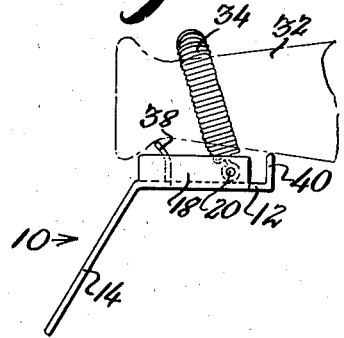
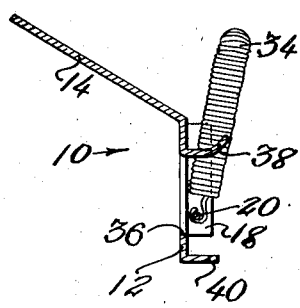
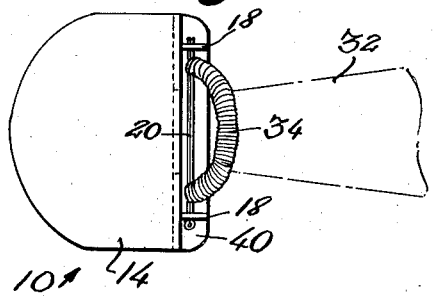
INVENTOR.
Joseph S. Kirby
BY Victor J. Evans & Co.
ATTORNEYS Patented July 26, 1949

2,477,519

UNITED STATES PATENT OFFICE 2,477,519

WATER SPRAYER FOR GARDEN HOSE NOZZLES

Joseph S. Kirby, San Anselmo, Calif.

Application March 26, 1946, Serial No. 657,256

2 Claims. (Cl. 299—76)

1

This invention relates to a water sprayer attachment for the conventional type of garden hose nozzle wherein a barrel is rotatably mounted with respect to a fixed pin having an end thereon cooperatively adjacent the discharge end of the barrel; when the barrel is rotated relative to the pin, the size of the discharge opening between the barrel and the pin end is altered to vary the discharge from the nozzle.

A primary object of the invention is to provide a device that will provide the operator of the hose with a flat or fan spray in addition to the round and solid stream of water that at the present time is the only type of spray obtainable from this type of nozzle.

The attachment enables a person to obtain a flat spray at will without changing the nozzle which requires time in shutting off the water in addition to damaging the nozzle.

Another object of the invention is to provide a sprayer that can be adjusted to give a short or long, fine or heavy or wide and narrow types of spray.

A further object of the invention is to provide a device that is simple in operation and construction, durable and efficient in operation and will not interfere with the round solid stream of water discharged from the nozzle when in inoperative position.

With the above and other objects and advantages in view the invention consists of the novel details of construction, arrangement and combination of parts more fully hereinafter described, claimed and illustrated in the accompanying drawing in which:

Figure 1 is a side elevation of the embodiment of the invention as attached to a conventional hose nozzle shown in dotted lines.

Figure 2 is a side elevation with the device in inoperative position.

Figure 3 is a rear view thereof.

Figure 4 is a sectional view on the line 4—4 of Figure 3 and

Figure 5 is a top plan view of the device.

Referring more in detail to the drawing the reference numeral 10 designates the sprayer which comprises the flat plate 12 having an arm 14 formed at the upper marginal edge thereof in angular relation to the plate. It will be noted in Figure 3 that the plate 12 is cut out at 16 and

2 the portion thus formed is bent rearwardly to provide oppositely positioned and parallel flanges 18 which are apertured to receive a pin 20 which extends transversely of the plate 12.

The plate 12 is attached to a conventional nozzle 32 by means of a looped coil spring 34 which embraces the nozzle and retains the plate thereon.

The plate 12 is cut out at 36 at the approximate center thereof and the portion thus formed is bent to form a curved lug 38 which will engage the headed end of the nozzle 32 when the sprayer is in operative position as shown in Figure 1.

The end of the plate 12 is bent rearwardly to form the marginal edge flange 40 which engages the nozzle 32 as shown in Figure 2 when the sprayer is in inoperative position.

It will be seen that when the sprayer is to be attached to a conventional nozzle the spring 34 is slipped over the end of the nozzle and the sprayer is retained thereon by the spring. When in use the arm 14 is positioned as shown in Figure 1 in which position it is retained by tension of the spring 34 and is thus held against the stream of water issuing from the nozzle thereby converting the conventional solid round stream into a flat or fan spray as desired. When not in use the sprayer is turned back to assume the position shown in Figure 2 thus easing the tension on the spring permitting the sprayer to be rotated about the nozzle to provide a right or a left spray or an up or down spray when applied in operative position against the water stream. As the water stream issuing from the nozzle varies in form and volume depending upon the size of the discharge opening from the nozzle the ability to rotate the sprayer to any desired position is an important feature as it enables the operator to apply the sprayer without changing the adjustment of the nozzle selected by the operator as best suited to the particular spraying purpose. In other words the sprayer and the nozzle can be moved independently of each other and the sprayer may thus be applied against any side of any stream the operator may select for turning the stream into a flat or fan spray. This provides a great selectivity in flat spraying without having to change the water pressure in the hose.

It is believed that from the foregoing description when taken in connection with the illustrated embodiment of the invention that the structure and operation of the invention will be apparent to those skilled in the art and it is to be understood that changes in the details of construction, arrangement and combination of parts may be resorted to provided they fall within the spirit of the invention and the scope of the appended claims.

Having thus described the invention what is claimed as new and desired to be secured by Letters Patent is:

1. A device of the character described, comprising a flat plate, an arm formed at one end of the plate and bent upwardly in angular relation thereto, side flanges formed on said plate, a pin extended between said side flanges, a looped coil spring having each end thereof secured to said pin to permit the spring to embrace a nozzle, a flange and a curved lug formed on said plate on opposite sides of the points of connection of said spring, said lug and said flange in cooperation with said spring adapted to support the plate in operative or inoperative position and said spring permitting rotation of said plate about the axis of the nozzle.

2. A device of the character described, comprising: a plate having a flat portion, an arm bent upward at one end of the plate, a lug and a flange bent downward near the angle of the arm and at the end opposite the arm, respectively, and each being recessed to fit against a hose nozzle, and means formed in the sides of the plate intermediate the lug and the flange for securing a spring; and a coil spring having its ends secured to the means formed therefor in the plate, said spring being of a length sufficient to encompass said nozzle securely and provide a flexible resilient mounting for positioning the plate in either of two positions on the nozzle with respect to the discharge end thereof.

JOSEPH S. KIRBY.

REFERENCES CITED

The following references are of record in the file of this patent:

UNITED STATES PATENTS

| Number | Name | Date |
|---|---|---|
| 643,526 | Orford | Feb. 13, 1900 |
| 1,644,072 | Miller | Oct. 4, 1927 |
| 1,745,914 | Rogan | Feb. 4, 1930 |

FOREIGN PATENTS

| Number | Country | Date |
|---|---|---|
| 169,265 | Switzerland | Aug. 1, 1934 |